US005545707A

United States Patent [19]
Heidingsfeld et al.

[11] Patent Number: 5,545,707
[45] Date of Patent: Aug. 13, 1996

[54] MULTISTAGE PROCESS FOR PRODUCING THERMOPLASTIC POLYURETHANE ELASTOMERS

[75] Inventors: Herbert Heidingsfeld, Frechen; Wolfgang Bräuer, Leverkusen; Friedemann Müller, Neuss; Willi Meister, Dormagen, all of Germany

[73] Assignee: Bayer Aktiengesellschaft, Leverkusen, Germany

[21] Appl. No.: 63,374

[22] Filed: May 18, 1993

[30] Foreign Application Priority Data

May 26, 1992 [DE] Germany .................. 42 17 365.5

[51] Int. Cl.⁶ ................... C08G 18/10; C08G 18/40; C08G 18/30
[52] U.S. Cl. .................. 528/60; 528/61; 528/65; 528/76; 528/77; 528/80; 528/81; 528/83; 528/85; 528/59
[58] Field of Search ............... 528/60, 61, 65, 528/76, 77, 80, 81, 83, 85, 59

[56] References Cited

U.S. PATENT DOCUMENTS

| | | | |
|---|---|---|---|
| 3,642,964 | 2/1972 | Rausch, Jr. | 264/40 |
| 3,963,656 | 6/1976 | Meisert et al. | 524/230 |
| 4,098,772 | 7/1978 | Bonk et al. | 528/76 |
| 4,119,613 | 10/1978 | Reischl et al. | 528/80 |
| 4,245,081 | 1/1981 | Quiring et al. | 528/65 |
| 4,521,582 | 6/1985 | Goyert et al. | 528/65 |
| 4,597,927 | 7/1986 | Zeitler et al. | 528/65 |
| 4,608,418 | 8/1986 | Czerwinski et al. | 528/80 |
| 4,948,860 | 8/1990 | Solomon et al. | 528/76 |
| 5,096,993 | 3/1992 | Smith et al. | 528/61 |
| 5,278,274 | 1/1994 | Verhelst et al. | 528/44 |
| 5,391,682 | 2/1995 | Ogawa et al. | 528/59 |

FOREIGN PATENT DOCUMENTS

| | | |
|---|---|---|
| 1964834 | 7/1971 | Germany . |
| 1057018 | 2/1967 | United Kingdom . |
| 9301222 | 1/1993 | WIPO . |

OTHER PUBLICATIONS

Kunststoffe 68 (1978) pages 819 to 825.
Seefried et al, J. Appl. Pol. Sci., vol. 19, 1985, pp. 2493–2502.
Wilkes et al J. Appl. Pol. Sci., vol. 29, 1984, pp. 2695–2711.

Primary Examiner—James J. Seidleck
Assistant Examiner—Rabon Sergent
Attorney, Agent, or Firm—Joseph C. Gil; Aron Preis

[57] ABSTRACT

Thermoplastically processable polyurethane elastomers are prepared by A) mixing one or more substantially linear polyols with a diisocyanate, B) reacting the resultant mixture substantially completely in a reactor at temperatures of >100° C. to form a prepolymer, C) mixing the prepolymer with low molecular weight chain extenders, D) applying the reaction mixture prepared in stage C) to a support and allowing the mixture to react thereon to solidification.

6 Claims, No Drawings

MULTISTAGE PROCESS FOR PRODUCING THERMOPLASTIC POLYURETHANE ELASTOMERS

BACKGROUND OF THE INVENTION

The present invention relates to a process for the continuous production of thermoplastically processable polyurethane elastomers by a multistage prepolymer/belt process.

Thermoplastic polyurethane elastomers (TPUs) are well known. They are important industrially due to a combination of high-grade mechanical properties and the known cost advantages which result from thermoplastic workability. A broad and varied range of mechanical properties may be achieved by using different chemical structural components. An overview of TPUs, their properties and uses is described, e.g., in Kunststoffe 68 (1978), pages 819 to 825, or in Kautschuk, Gummi, Kunststoffe 35 (1982), pages 568 to 584.

TPUs are prepared from linear polyols, generally polyesters or polyethers, organic diisocyanates and shortchain diols (chain extenders). They may be prepared by either a continuous or discontinuous process. The process known as the belt process and the extruder process are the best-known processes for their preparation and used industrially.

According to British Patent 1,057,018, a prepolymer is prepared from a substantially linear polyhydroxyl compound and excess organic diisocyanate at temperatures of <100° C., cooled and delivered by a metering pump to a mixing head where it is mixed with a certain quantity of a low molecular weight diol. The reaction mixture obtained is placed on a conveyor belt while heating to a temperature of up to 130° C. The reaction product is then size-reduced and heated. The long reaction time of 1 to 2 hours required for prepolymer formation is an economic disadvantage of this process.

In the extruder process, which is described for example in German Offenlegungschrifts 1,964,834 and 2,059,570, the reaction components (i.e., the polyhydroxyl compounds, the diisocyanate and the low molecular weight glycols) are introduced into the extruder. They are individually premixed or directly introduced into the extruder as a preadduct of polyhydroxyl compound and diisocyanate and the reaction is carried out in the extruder under certain process conditions. The thermoplastic polyurethane thus produced is extruded in the form of a strand, cooled and size-reduced. The disadvantage of TPU's produced by this process is that their properties are not of a uniformly high standard for all applications. TPU's of the same composition produced by the extruder process are transparent while TPU's produced by the belt process have an opaque appearance. Opaque TPU's may readily be processed to films while transparent TPU's are less suitable for this purpose due to their tendency towards blocking.

Accordingly, there is still a need to find an economic process by which it would be possible to produce both hard injection moldings and flexible films selectively and under controlled conditions.

DESCRIPTION OF THE INVENTION

A process for the continuous production of thermoplastically processable polyurethane elastomers has now surprisingly been found in which a polyurethane is produced by a multistage process comprising:

A) mixing one or more substantially linear polyols having molecular weights of 500 to 5000 with a diisocyanate corresponding to the general formula OCN—Z—NCO, in which Z is a difunctional organic radical, B) reacting the mixture prepared in stage A) substantially completely in a reactor at temperatures of >100° C. to form a prepolymer, C) mixing the prepolymer prepared in stage B) with low molecular weight diol chain extenders and, optionally, triol and/or diamine chain extenders, said chain extenders having molecular weights of 62 to 500, the amounts of components being such that the total NCO: active H ratio for all the components used in stages A), B) and C) is from 0.9:1 to 1.2:1, D) applying the reaction mixture prepared in stage C) to a support and allowing the mixture to react thereon to solidification, and E) optionally, melting the solidified reaction mixture prepared in stage D) in an extruder and with auxiliaries and/or other components being incorporated therein.

Preferred polyols are polyester diols, polyether diols, polycarbonate diols and mixtures thereof.

Suitable polyether diols may be prepared by reacting one or more alkylene oxides having from 2 to 4 carbon atoms in the alkylene radical, with an initiator molecule which contains two active hydrogen atoms. Examples of alkylene oxides include ethylene oxide, 1,2-propylene oxide, epichlorhydrin and 1,2-and 2,3-butylene oxide. Ethylene oxide, propylene oxide and mixtures of 1,2-propylene oxide and ethylene oxide are preferred used. The alkylene oxides may be used individually, in sequence with one another, or as mixtures. Examples of initiator molecules include water; aminoalcohols such as N-alkyldiethanolamine, e.g. N-methyl-diethanolamine; and diols, such as ethyleneglycol, 1,3-propyleneglycol, butane-1,4-diol and hexane-1,6-diol. Mixtures of initiator molecules may also be used. Suitable polyetherols also include the hydroxyl group-containing polymerization products of tetrahydrofuran. The substantially linear polyether diols preferably have molecular weights of from 500 to 5000. They may be used both individually or in the form of mixtures with one another.

Suitable polyester diols may be produced for example from dicarboxylic acids having from 2 to 12 carbon atoms, and preferably from 4 to 6 carbon atoms, and polyhydric alcohols. Examples of dicarboxylic acids which may be used include aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids may be used individually or as mixtures, e.g. in the form of a succinic, glutaric and adipic acid mixture. In some cases, it may be advantageous to use, in place of the dicarboxylic acids, the corresponding dicarboxylic-acid derivatives, such as carboxylic acid diesters having from 1 to 4 carbon atoms in the alcohol radical, carboxylic acid anhydrides or carboxylic acid chlorides. Examples of polyhydric alcohols include glycols having from 2 to 10, and preferably from 2 to 6, carbon atoms, such as ethyleneglycol, diethyleneglycol, butane-1,4-diol, pentane-1,5-diol, hexane-1,6-diol, decane-1,10-diol, 2,2-dimethylpropane-1,3-diol, propane-1,3-diol and dipropyleneglycol. The polyhydric alcohols may, depending on the required properties, be used either alone or in mixture with one another.

Esters of carbonic acid with the above noted diols (especially those having from 4 to 6 carbon atoms, such as butane-1,4-diol and/or hexane-1,6-diol), condensation products of ω-hydroxycarboxylic acids (e.g. ω-hydroxycaproic acid) and preferably polymerization products of lactones (e.g., optionally substituted ω-caprolactones) are also suitable.

The preferred polyester diols are ethanediol polyadipates; butane-1,4-diol polyadipates; ethanediol butane-1,4-diol polyadipates; hexane-1,6-diol neopentylglycol polyadipates; hexane-1,6-diol butane-1,4-diol polyadipates; and polycaprolactones.

The polyester diols have molecular weights of from 500 to 5000.

Suitable organic diisocyanates include aliphatic, cycloaliphatic, araliphatic, heterocyclic and aromatic diisocyanates. Such isocyanates are described in, for example, Justus Liebigs Annalen der Chemie, 562, pages 75 to 136.

Specific examples of useful isocyanates include hexamethylene diisocyanate; isophorone diisocyanate; cyclohexane-1,4-diisocyanate; 1-methyl-2,4- and -2,6-cyclohexanediisocyanate, and the isomer mixtures thereof; 4,4'-, 2,4'- and 2,2'-dicyclohexyl methane diisocyanate and the isomer mixtures thereof; tolylene-2,4-diisocyanate, and mixtures of tolylene-2,4-diisocyanate and tolylene-2,6-diisocyanate; 4,4'-2,4'- and 2,2'-diphenyl methane diisocyanate; mixtures of 2,4'- and 4,4'-diphenyl methane diisocyanate; urethanemodified liquid 4,4'-and/or 2,4'-diphenyl methane diisocyanates; 4,4'-diisocyanatodiphenylethane-(1,2); and 1,5-naphthylene diisocyanate. Preferred isocyanates are hexamethylene-1,6-diisocyanate; isophorone diisocyanate; dicyclohexyl methane diisocyanate; diphenylmethane-diisocyanate isomer mixtures having a 4,4'-isomer content of more than 96 wt-%; 4,4'-diphenylmethanediisocyanate; and 1,5-naphthylenediisocyanate.

The diisocyanates may be used together with up to 15% by weight (based on the amount of diisocyanate) of a polyisocyanate, provided that the amount used does not cause formation of a crosslinked product which is no longer thermoplastic. Examples of such polyisocyanates include triphenyl methane-4,4',4"-triisocyanate and polyphenyl polymethylene polyisocyanates.

Preferred chain extenders having molecular weights of from 62 to 500 are aliphatic diols having from 2 to 14 carbon atoms, such as e.g. ethanediol, hexane-1,6-diol, diethyleneglycol, dipropyleneglycol and especially butane-1,4-diol.

Also suitable as chain extenders are diesters of terephthalic acid with glycols having from 2 to 4 carbon atoms, such as e.g. terephthalic acid-bis-ethyleneglycol or -butane-1,4-diol; hydroxyalkylene ethers of hydroquinone, such as e.g. 1,4-di-(β-hydroxyethyl )hydroquinone; (cyclo)aliphatic diamines, such as e.g. isophorone diamine, ethylene diamine, 1,2- and 1,3-propylenediamine, N-methylpropylenediamine-1,3, N,N'-dimethylethylenediamine; and aromatic diamines, such as e.g. 2,4- and 2,6-tolylene diamine, 3,5-diethyl-2,4- and/or -2, 6-tolylene diamine, and primary ortho-dialkyl-, trialkyl-and/or tetraalkyl-substituted 4,4'-diaminodiphenylmethanes.

The diol chain extenders may be used together with up to 15% by weight (based on the amount of the diol chain extender) of a triol of molecular weight of up to 500, provided that the amount used does not cause formation of a crosslinked product which is no longer thermoplastic. Examples of such triols include glycerin, trimethylolpropane, and relatively low molecular weight alkylene oxide adducts thereof polymethylene polyisocyanates.

The reaction components, optionally in the presence of catalysts, auxiliary substances and/or additives, are reacted in such quantities that the equivalent ratio of isocyanate groups to the sum of the isocyanate-reactive groups for all the components used in stages A), B) and C) (preferably only OH groups are present) is from 0.9:1 to. 1.2:1, and more preferably from 0. 95: 1 to 1.1:1.

Suitable catalysts, which especially accelerate the reaction between the isocyanate groups and hydroxyl groups, include tertiary amines which are known according to prior art and which are conventional, such as e.g. triethylamine, dimethylcyclohexylamine, N-methylmorpholine, N, N'-dimethyl-piperazine, 2-(dimethylaminoethoxy)-ethanol, diazabicyclo-(2,2,2)-octane and the like, as well as organic metal compounds such as titanic acid esters, iron compounds, tin compounds, e.g. tin diacetate, tin dioctoate, tin dilaurate or the tin dialkyl salts of aliphatic carboxylic acids such as dibutyl tin diacetate, dibutyl tin dilaurate and the like. The catalysts are generally utilized in quantities of from 0.0005 to 0.1 parts per 100 parts of hydroxy group containing compound.

In addition to catalysts, auxiliary substances and/or additives may also be used. Examples include lubricants; inhibitors; hydrolysis, light, heat and discoloration stabilizers; flameproofing agents; dyes; pigments; inorganic and/or organic fillers; and reinforcing materials.

Reinforcing materials are, in particular, fibrous reinforcing materials such as, e.g., inorganic fibers which are known and used in polyurethane chemistry and which may be treated with a sizing agent.

More detailed information regarding such auxiliary agents and additives is described in the literature, for example, the monograph by J. H. Saunders and K. C. Frisch, in "High Polymers", Volume XVI, Polyurethanes, Parts 1 and 2, published by Interscience Publishers in 1962 and 1964, respectively, or in German Auslegeschrift 2,901,774.

Other additives which which may be incorporated in the TPU's are thermoplastics such as polycarbonates, polyester and acrylonitrile/butadiene/styrene terpolymers (e.g., ABS). Other elastomers such as rubber, ethylene/vinyl acetate polymers, styrene/butadiene copolymers, and other TPU's may also be used. Commercially available plasticizers, such as phosphates, phthalates, adipates, and sebacates, may also be used.

The components of stage A) are thoroughly mixed at temperatures above their melting point, preferably in a high-shear mixing unit. For example, mixing may be carried out in a mixing head, preferably a high-speed toothed-roll mixer, or in a nozzle. According to the invention, the prepolymer reaction (stage B)) should be continued to a substantially complete conversion. More than 80% polyol should preferably be reacted in this stage. The reaction temperatures are above 100° C. and preferably in the range from 100° C. to 250° C. The preferably continuous process is carried out in a tube reactor of which the length is such that, in conjunction with the reaction temperature, the conversion described above is guaranteed. The length-to-diameter ratio is preferably between 2:1 and 20:1. Conversely-, for a constant tube length, the reaction must be controlled, for example, through the temperature in such a way that the described conversion is achieved.

In one particularly preferred embodiment, stages A) and B) are carried out in an intensively stirred tube reactor having a length-to-diameter ratio of 4:1 to 15:1. However, a combination of a nozzle and tube reactor, optionally with stirring, may also be used.

In stage C), the prepolymer prepared in stages A) and B) is mixed with the low molecular weight diol and, optionally, triol and/or diamine chain-extending agents. In the preferred continuous process, mixing should take place immediately after the substantially completed prepolymer reaction. A high shear-mixing unit, for example, a mixing head a nozzle or a screw extruder, is preferably used for this stage also. Mixing may even be carried out after the prepolymer reaction in the last part of the stirred tube reactor mentioned above.

In stage D), the reaction mixture prepared in stage C) is applied directly and continuously to a support, preferably a conveyor belt, on which it is allowed to react until the material has solidified. To this end, the conveyor belt is preferably guided through a heating zone having a predetermined temperature of >110° C. The speed of the conveyor belt is adjusted in dependence upon the heating temperature so that the chain-extending reaction is continued to a substantially complete conversion.

In another variant of the invention, the reaction mixture solidified on the conveyor belt may be continuously introduced into an extruder. Known extruders, such as, for example, single-screw and twin-screw extruders, and also buss kneaders are preferably used. The temperatures of the extruder housing are selected so that the solidified reaction mixture is melted, the chain-extending reaction is taken to a complete conversion and the possible incorporation of the auxiliaries mentioned above and the other components can be carried out without any adverse effect on the end product.

By virtue of the optimal conditions prevailing in each stage, TPU's having a broad range of properties can be selectively produced under control with only minor variations in their properties by the multistage prepolymer process according to the invention.

The products thus obtained have very good mechanical properties and are suitable for the production of injection molded articles and polyurethane films.

The invention is further illustrated but is not intended to be limited by the following examples in which all parts and percentages are by weight unless otherwise specified.

EXAMPLES

Example 1

100 Parts by weight of a polybutanediol ether (molecular weight about 1000, were heated to 180° C. and introduced by means of a gear pump into a tube equipped with a toothed-roll mixer. 50 Parts by weight molten (50° C.) 4,4'-diphenyl methane diisocyanate (MDI) are pumped into the same tube by a second gear pump. The tube has a length-to-diameter ratio of 8:1. The rotational speed of the mixer is approximately 1500 r.p.m. The addition rate was adjusted so that the prepolymer mixture left the tube reactor with a conversion of about 95 mol-%, based on polyether. To determine conversion, product samples were first short-stopped in dibutyl amine solution. Back-titration with HCl gave the unreacted NCO content from which conversion can be calculated.

In a directly adjoining mixing head, the prepolymer was then continuously mixed briefly and intensively with 10 parts by weight butanediol (60° C.) introduced by means of a gear pump.

The reaction mixture obtained was directly applied to a conveyor belt which travelled continuously for about 1 minute through a zone heated to 130° C.

At the end of the zone, the solidified melt was cooled in air and granulated. The granules were processed by injection molding to test specimens on which the properties set out in the Table were measured.

The moldings produced had good demolding properties. The tubular films obtained from the granules could readily be extruded.

Example 2

As in Example 1, the polybutanediol ether was heated to 200° C. and reacted in a tube reactor to form the prepolymer. The addition rate was increased so that the prepolymer again left the reactor with a conversion of approximately 95%.

The moldings produced were readily demoldable. The tubular films obtained from the granules could readily be extruded.

Example 3

As in Example 1, 100 parts by weight of a polybutane-1,4-diol adipate (molecular weight about 2250), were heated to 140° C. and reacted with 114 parts by weight MDI to form the prepolymer. The conversion reached a level of 98% in the tube reactor.

In the mixing head, the prepolymer was mixed with a mixture of 35 parts by weight butanediol, 1.75 parts by weight hexanediol and 1.27 parts by weight stearyl alcohol.

The melt, solidified at the end of the conveyor belt, was introduced into a twin-screw extruder with a diameter of 53 mm and housing temperatures of 140° C. to 200° C. 1.5 Parts by weight bis-ethylene stearyl amide (moulding auxiliary) and 34 parts by weight of an ABS powder (Novodur, Bayer) were introduced at the middle of the extruder by weight feeders.

At the end of the screw, the hot melt was drawn off in the form of a strand, cooled in water and granulated. The moldings produced were readily demoldable.

Example 4

As in Example 3, 100 parts by weight of a polybutane-1,4-diol adipate (molecular weight about 2250), were reacted with 40 parts by weight MDI in a tube reactor to form the prepolymer in a conversion of 97%.

The prepolymer was mixed with 10.5 parts by weight butanediol in the mixing head. After the conveyor belt, the strand was introduced into a twin-screw extruder with a diameter of 60 mm and housing temperatures of 180° to 220° C. The rotational speed was 60 r.p.m.

0.6 Part by weight bis-ethylene stearyl amide was introduced into the first extruder housing.

The moldings produced were readily demoldable. The tubular films obtained from the granules could readily be extruded.

The results of tests conducted on the products were as set forth in the table which follows.

TABLE 1

| Example | | 1 | 2 | 3 | 4 |
|---|---|---|---|---|---|
| Hardness | DIN 53 505 Shore A | 82 | 82 | 97 | 85 |
| | Shore D | | | 61 | |
| Modulus 100% | DIN 53 504 MPa | 5.5 | 5.2 | 27 | 6.5 |
| Tensile stress at break | DIN 53 504 MPa | 43.6 | 41.1 | 55 | 50.5 |
| Elongation at break | DIN 53 504% | 500 | 510 | 360 | 480 |
| Elasticity | DIN 53 512% | 49 | 48 | 39 | 44 |
| Abrasion | DIN 53 516 mm3 | 20 | 20 | 30 | 30 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A multistage process for the continuous production of thermoplastically processable polyurethane elastomers comprising:

A) continuously mixing one or more substantially linear polyols having molecular weights of 500 to 5000 with a diisocyanate corresponding to the formula OCN—Z—NCO, in which Z is a difunctional organic radical, B) continuously reacting the mixture prepared in stage A) completely in a reactor at temperatures of from 100° C. to 250° C. to form a prepolymer, wherein stage A) and stage B) are carried out together in an intensively stirred tube reactor having length-to-diameter ratio of 4:1 to 15:1, C) continuously mixing the prepolymer prepared in stage B) with low molecular weight diol chain extenders and, optionally, triol and/or diamine chain extenders, said chain extenders having molecular weights of 62 to 500, wherein triol is present in an amount of up to 15 percent relative to the weight of said diol chain extender, the amounts of components being such that the total NCO:active H ratio for all the components used in stages A), B) and C) is from 0.9 to 1.2:1, D) applying the reaction mixture prepared in stage C) directly and continuously onto a conveyor belt, upon which said reaction mixture is allowed to react until it has solidified, and E) optionally, continuously melting the solidified reaction mixture prepared in stage D) in an extruder and with auxiliaries and/or other components being incorporated therein.

2. The process of claim 1, wherein
i) said polyols are selected from the group consisting of polyester diols, polyether diols, polycarbonate diols and mixtures thereof,
ii) said diisocyanate is selected from the group consisting of dicyclohexyl methane diisocyanate, isophorone diisocyanate, hexamethylene diisocyanate, naphthylene diisocyanate, 4,4-diphenylmethane diisocyanate, diphenylmethane diisocyanate isomer mixtures containing more than 96% by weight of 4,4'-diphenylmethane diisocyanate and mixtures thereof.

3. The process of claim 1, wherein a member selected from the group consisting of thermoplastics, reinforcing materials, plasticizers and mixtures thereof is introduced into the extruder as a further component in stage E.

4. Thermoplastically processable polyurethane elastomers produced by the process of claim 1.

5. A multistage process for the continuous production of thermoplastically processable polyurethane elastomers comprising:

A) in a high-shear mixing unit, continuously mixing one or more substantially linear polyols having molecular weights of 500 to 5000 with a diisocyanate corresponding to the formula OCN—Z—NCO, in which Z is a difunctional organic radical, B) continuously reacting the mixture prepared in stage A) completely in a tube reactor having a length-to-diameter ratio of from 2:1 to 20:1 at temperatures of from 100° C. to 250° C. to form a prepolymer, C) in a high shear mixing unit, continuously mixing the prepolymer prepared in stage B) with low molecular weight diol chain extenders and, optionally, triol and/or diamine chain extenders, said chain extenders having molecular weights of 62 to 500, wherein triol is present in an amount of up to 15 percent relative to the weight of said diol chain extender, the amounts of components being such that the total NCO:active H ratio for all the components used in stages A), B) and C) is from 0.9:1 to 1.2:1, D) applying the reaction mixture prepared in stage C) directly and continuously onto a conveyor belt, and guiding said reaction mixture through a zone heated to a temperature of >110° C. until said reaction mixture has solidified, and E) optionally, continuously melting the solidified reaction mixture prepared in stage D) in an extruder and with auxiliaries and/or other components being incorporated therein.

6. The process of claim 5, wherein
i) said polyols are selected from the group consisting of polyester diols, polyether diols, polycarbonate diols and mixtures thereof,
ii) said diisocyanate is selected from the group consisting of dicyclohexyl methane diisocyanate, isophorone diisocyanate, hexamethylene diisocyanate, naphthylene diisocyanate, 4,4'-diphenylmethane diisocyanate, diphenylmethane diisocyanate isomer mixtures containing more than 96% by weight of 4,4'-diphenylmethane diisocyanate and mixtures thereof.

* * * * *